April 6, 1954
H. B. BARRETT
2,674,124
BRAKE LINING TESTING MACHINE
Filed June 6, 1951
2 Sheets-Sheet 1
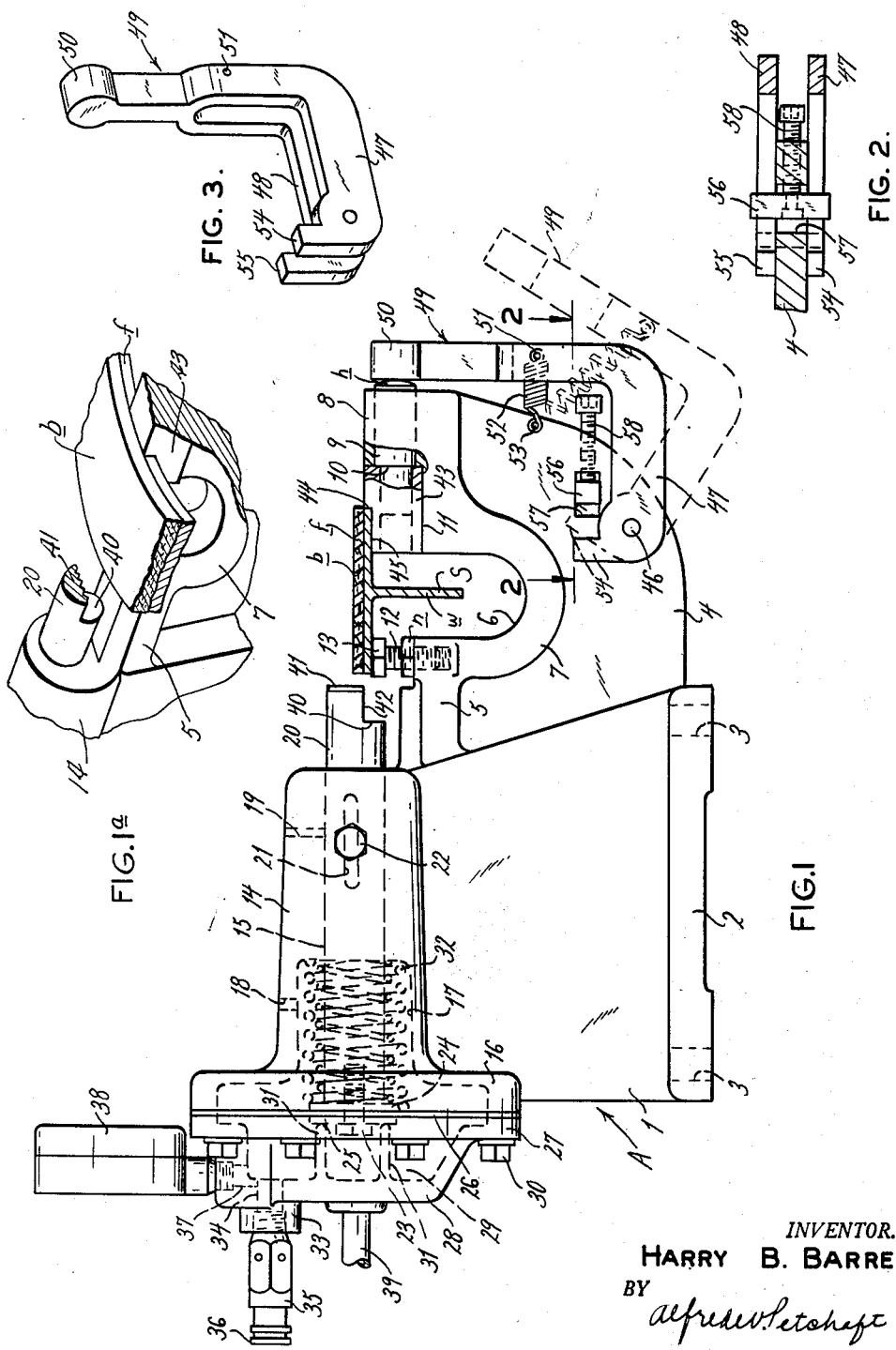
INVENTOR.
HARRY B. BARRETT
BY
*Alfred W. Petcheft*
ATTORNEY

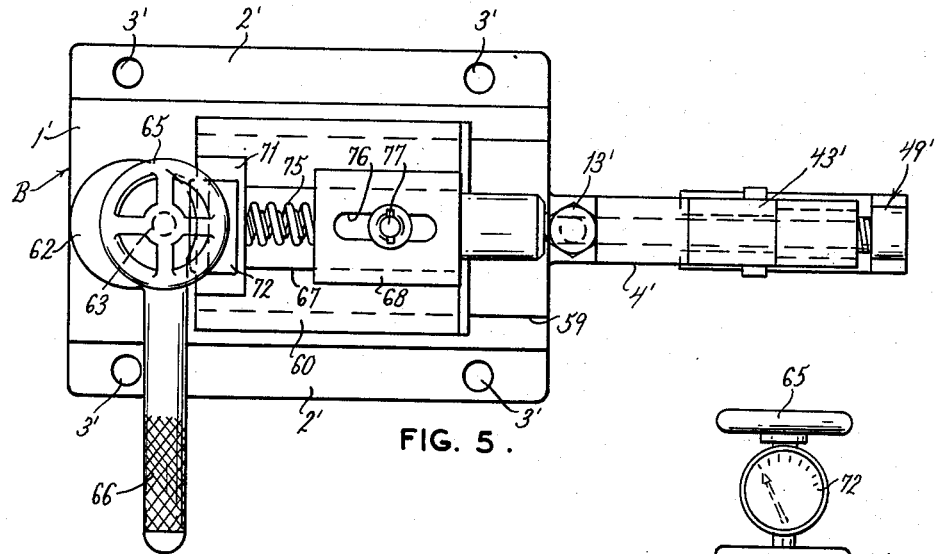

Patented Apr. 6, 1954

2,674,124

UNITED STATES PATENT OFFICE 2,674,124

BRAKE LINING TESTING MACHINE

Harry B. Barrett, Clayton, Mo.

Application June 6, 1951, Serial No. 230,127

5 Claims. (Cl. 73—101)

This invention relates in general to certain new and useful improvements in brake lining testing machines and, more particularly, to a testing machine for determining the degree of adherence between a brake shoe and brake lining which is adhesively cemented thereto and is related to my copending application Serial No. 181,781, filed August 28, 1950, now Patent No. 2,667,781.

It is the primary object of the present invention to provide a machine for testing the strength of the cementitious bond between a brake shoe and the lining bonded thereto.

It is a further object of the present invention to provide a testing machine of the type stated which is simple and economical in construction and can be operated quickly and efficiently by the average automotive repair mechanic without any undue amount of specialized training or skill.

It is an additional object of the present invention to provide a testing machine of the type stated which is capable of applying a sharp impact or shock of predetermined force to the materials being tested so as to indicate the relative brittleness or toughness of the adhesive film.

It is also an object of the present invention to provide a testing machine which is capable of rendering substantially uniform and standardized test-results in a simple and readily interpretable manner.

With the above and other objects in view, my invention resides in the novel features of form, construction, arrangement, and combination of parts presently described and pointed out in the claims.

In the accompanying drawings—

Figure 1 is a side elevational view of a brake shoe testing machine constructed in accordance with and embodying the present invention;

Figure 1a is a fragmentary perspective view of the ram and brake shoe supporting structure forming a part of the present invention;

Figure 2 is a fragmentary sectional view taken along line 2—2 of Figure 1;

Figure 3 is a perspective view of the impact hammer forming a part of the present invention;

Figure 4 is a side elevational view, partly broken away and in section, of a modified form of brake shoe testing machine constructed in accordance with and embodying the present invention;

Figure 5 is a top plan view of the modified form of brake shoe testing machine; and Figures 6 and 7 are fragmentary sectional views taken along lines 6—6 and 7—7, respectively, of Figure 4.

Referring now in more detail and by reference characters to the drawings, which illustrate practical embodiments of the present invention, A designates a brake shoe testing machine comprising a hollow base casting 1 having integrally formed horizontally extending ears 2, which are vertically bored in the provision of bolt-receiving apertures 3 by which the machine may be conventionally bolted down to any suitable table, pedestal, base, or other support (not shown).

Formed integrally with, and projecting forwardly from, the front wall of the base casting 1 is an outwardly extending arm 4 provided along its upper horizontal margin with a relatively thick top flange 5 formed in its central portion with an upwardly opening U-shaped recess 6, the lower margin of which is reinforced with a correspondingly shaped semi-circular flange 7. At its forward or outer end, the flange 5 is integrally provided with an enlarged boss 8, which is horizontally bored for slidably receiving a pin 9 which projects outwardly therefrom at its forward end to provide an impact face $h$. The pin 9 at its rearward end is diametrally reduced to form an annular shoulder 10, and such diametrally reduced end projects rearwardly over, and in upwardly spaced parallel relation to a flat face 11 milled horizontally across the top of the flange 5 between the rear face of the boss 8 and the proximate margin of the U-shaped recess 6. On the opposite side of the U-shaped recess 6, with respect to the face 11, the flange 5 is provided with a vertically adjustable screw 12 having an integrally formed brake shoe supporting pad 13 at its upper end and held in any selected position of vertical adjustment by a lock-nut $n$.

Formed integrally with, and extending horizontally across, the top of the base casting 1 is a tubular housing 14 having a horizontally disposed smooth bore 15, the axial or center line of which is coincident with the vertical center plane of the arm 4 and the axial or center line of the pin 9. At its rear end, the housing 14 is diametrally enlarged in the provision of an annular diaphragm flange 16, and forwardly of the diaphragm flange 16 for approximately half of its length the housing is counterbored in the provision of an intermediate recess 17. In addition, the housing is provided at suitably spaced points along its length with a vertically disposed vent-hole 18 and oil-hole 19. Slidably mounted in, and projecting forwardly from, the bore 15 is a rod-shaped ram 20 provided along that portion of its length which is located in the bore 15 with a laterally presented horizontal slot 21 adapted for sliding engagement with a stop screw 22, which is threadedly mounted in, and extends through, one side of the housing 14 to limit both forward and rearward movement of the ram 20 and prevent unauthorized withdrawal of the ram 20 from the bore 15. At its rearward end, the ram 20 projects through the recess 17 and is operatively attached, by means of a bolt 23 and a pair of diaphragm disks 24, 25, to a flexible diaphragm 26, which is, in turn, disposed around its peripheral margin against the flat face of the diaphragm flange 16, being secured in pressure-tight engagement by the corresponding annular flange 27 of a cover plate 28, the latter extending over, and in outwardly spaced relation to, the diaphragm 26 in the formation of a pressure chamber 29, the cover plate 28 being conventionally held in place by a uniformly spaced annular series of bolts 30.

It should be noted in this connection that the inner face of the cover plate 28 is provided with three horizontally inwardly projecting bosses 31 disposed at one hundred twenty degrees from each other concentrically around the axial line of the ram 20 for endwise abutting engagement against the rearwardly presented face of the diaphragm disk 24 to act as a rear stop, against which the diaphragm assembly will normally be biased by a heavy double-wound compression spring 32, which is disposed concentrically around the portion of the ram 20 which extends through the recess 17, the spring 32 being disposed abuttingly at its opposite ends respectively against the forwardly presented face of the diaphragm disk 24 and the rearwardly presented or inner end wall of the recess 17.

The cover plate 28 is provided, vertically above its center, with an integral boss 33, which is horizontally drilled from its rear face in the provision of an air passage 34, communicating at its forward end with the chamber 29, and at its rearward end is counterbored and threaded to receive a conventional adjustable pressure relief valve 35 having a spring-biased element 36 which can be screwed in or out so that pressure within the chamber 29 can be maintained at any desired maximum within the range of adjustment for which the valve 35 was designed. The boss 33 is also provided with a vertical air passage 37 opening downwardly into the air passage 34. At its upper end, the passage 37 is counterbored and threaded for receiving a conventional air pressure gauge 38.

Threadedly mounted in, and extending through the central portion of, the cover 28, preferably, though not necessarily, in axial alignment with the ram 20, is an air pipe 39, which is connected to a conventional source of air pressure (not shown).

The outwardly or forwardly projecting end of the ram 20 is milled off along its under face, as at 40, to provide a pressure-applying portion or element 41, which is of reduced cross-sectional area and has a downwardly presented or under face 42 which is arcuate along a radius approximately corresponding to the radius of the brake which is to be tested. The under face 42, furthermore, is spaced upwardly from the horizontal face of the brake shoe supporting pad 13 by a distance slightly greater than the thickness of the flange $f$ of the brake shoe S, so that the pressure asserted by the ram 20 will be applied to the edge of the brake lining $b$. In order to facilitate the application of pressure to the brake lining $b$, the end face of the ram 20 is preferably serrated, as best seen in Figure 1a.

Removably mounted upon the pin 9 and resting snugly upon the upwardly presented face 11 of the arm flange 5 is an anvil block 43, which is likewise cut away upon its upper face to provide a shoulder 44 and an arcuate supporting face 45, the latter being similar in contour to, and in aligned registration with, the supporting face 11. The vertical height of the shoulder 44 is somewhat smaller than the thickness of the brake shoe flange $f$.

Rigidly mounted in the arm 4 and projecting equidistantly outwardly on opposite sides thereof is a pin 46 for bearing-forming disposition in the clevis-like legs 47, 48, of an L-shaped impact hammer 49 integrally provided at its upper end with a head 50 adapted to strike against the impact face $h$ of the pin 9. Fixed in, and extending horizontally between, the legs 47, 48, adjacent their upper ends is a pin 51 for hooked engagement with one end of a strong spring 52, which is, in turn, hooked at its other end over a pin 53 driven into one side face of the arm 4 and normally holds the impact hammer 49 in the position shown in full lines in Figure 1. Formed integrally on the pivoted ends of the clevis-like legs 47, 48, respectively, are upstanding stop-bosses 54, 55, for abutment against an adjustable stop-block 56 slidably mounted in a rectangular slot 57 extending through the arm 4. The stop-block 56 is swivelly mounted on the end of an adjustment screw 58 threadedly mounted in the arm 4 and projecting outwardly from the forward face thereof. By this means, it is possible, within predetermined limits, to establish the distance to which the impact hammer 49 may be pulled out and released and consequently the amount of impact force can be varied as needed. When the impact hammer 49 is manually pulled out, for example, to the position shown in dotted lines in Figure 1, and then released, the spring 52 will swing the impact hammer 49 rapidly and forcibly back to original position, striking the head $h$ of the pin 9 a sharp blow.

In use, the bonded brake shoe S is set down upon the supporting surfaces 12, 45, in more or less centered or balanced relationship thereon with the brake shoe web $w$ extending freely downwardly into the U-shaped slot 6. The forwardly presented edge-face of the brake shoe will abut snugly against the shoulder 44. Thereupon, air pressure is admitted through the air pipe 39 into the chamber 29 by means of any suitable valve (not shown). The pressure will build up to whatever maximum limit is permitted by the relief valve 35 and the diaphragm 26 will be pushed forwardly against the counter-balancing tension of the spring 32, thereby urging the ram forwardly. This initial forward movement preferably should be slowly and carefully performed so as to bring the serrated pressure-applying element 41 gently against the edge-face of the brake lining $b$ directly opposite the shoulder 44. Thereupon, the pressure may be allowed to build up very rapidly, imposing the desired force against the brake lining $b$. This force or pressure may, of course, be measured by the reading of the gauge 38 and will be imposed as a shear force directly across the area in which the cementitious binder is applied. As will be seen by reference to Figure 1, the shoulder 44 holds the brake shoe flange $f$ stationary while the pressure-applying element 41 of the ram 20 tends to push the brake lining $b$ forwardly. By increasing the maximum limit of pressure through suitable manipulation of the valve element 36, it is possible to determine the maximum limit of shear force which the cementitious bond will withstand, since the ram 20 will break the lining section b away from the brake shoe flange f at a pressure in excess of such maximum. Inasmuch as some adhesives are brittle and will fail under shock, even though capable of withstanding gradually applied pressures, the adhesive film is then "shock-tested." In such case, after the pressure has been built up to the desired limit, the impact head h of the pin 9 may be impacted with the impact hammer 49, as previously described. It will, of course, be understood that the amount of impact can be determined by appropriate setting of the stop-block 56.

By actual test under operating conditions, the necessary amount of strength required for such cementitious bonds may be determined for any given type of brake shoe, brake lining or set of established mechanical condition. Thereafter, subsequent bonded brake shoes can be tested to determine whether or not the bond will withstand the requisite amount of shear force. If, in establishing test results, an adequate margin of safety is allowed, as is customary in testing all automotive equipment, it will be possible to insure against improper, defective, or unsatisfactory bonding.

If desired, a modified form of brake shoe testing machine B may be provided, as shown in Figures 4 to 7, inclusive, which comprises a base casting 1' having horizontally extending ears 2', bolt-receiving apertures 3', a U-shaped arm 4', a shoe-supporting anvil-block 43', and adjustable supporting pad 13', all substantially identical with corresponding elements in the previously described brake shoe testing machine A. Formed integrally upon the upper face of the base casting 1' is a dovetail way 59 for shiftably supporting a horizontal slide 60, which is biased rearwardly by means of a spring 61 and rides against a horizontal eccentric 62, which is, in turn, journaled upon a vertical stud 63 threaded into the base casting 1' and provided at its upper end with an enlarged head 64 for bearing against the upper face of the eccentric 62 and adapted to receive the socketed end of a wheel-handle 65, so that, when tightened down, the stud 63 will lock the eccentric 62 at any position to which it is rotated. The eccentric 62 is integrally provided with a radially extending horizontal handle 66 by which it may be rotated when the stud 63 is loosened.

The slide 60 is integrally provided on its upper face with a secondary dovetail slide 67 for slidably supporting a ram-block 68, the forward end of which is shaped in substantially the same manner as the forward end of the ram 29 described above. At its rear end, the ram-block 68 is provided with a rearwardly projecting horizontal rod 69, which extends slidably into a bore 70 drilled horizontally in an upstanding boss 71 formed preferably integrally with the slide 60. Threadedly mounted in, and extending upwardly from, the boss 71 is a conventional dial-gauge 72 having its foot plunger 73 bearing against an oblique face 74 ground off on the rear end of the rod 69. Interposed between the boss 71 and ram-block 68 is a heavy compression spring 75 for biasing the ram-block 68 forwardly. The ram-block 68 is finally provided with a longitudinal slot 76 for receiving a vertical locking screw 77 threadedly mounted in the slide 60. At its upper projecting end, the screw 77 is provided with an enlarged head also adapted for receiving the socketed end of the wheel-handle 65.

On its forward end, the arm 4' is operatively provided with an impact hammer 49', substantially identical with the impact hammer 49 described above.

The brake shoe tester B is operated in much the same manner as the previously described brake shoe tester A and the brake shoe S' is similarly mounted in place for testing and the stud 63 and screw 77 loosened somewhat. Because brake shoes vary in width, the horizontal slide 60 is necessary to move the ram-block 68 up to contact position against the rearwardly presented edge of the lining b' by appropriate manipulation of the handle 66. Once the ram-block 68 is in contact position, the handle 66 is forcibly moved further, compressing the spring 75 to apply shear force against the brake shoe lining b'. The amount of such force is translated into relative movement between the slide 60 and ram-block 68 and such movement is measured by the dial-gauge 72. When a desired or predetermined shear force is reached, the screw 77 and stud 63 are locked and the impact test performed in the same manner as previously described.

It should be understood that changes and modifications in the form, construction, arrangement, and combination of the several parts of the brake lining testing machine may be made and substituted for those herein shown and described without departing from the nature and principle of my invention.

Having thus described my invention, what I claim and desire to secure by Letters Patent is:

1. A brake lining testing machine comprising a frame for holding a lined brake shoe with the edges of the shoe and the lining in substantially exposed position, anvil-forming means for engaging one exposed edge of the shoe while leaving the adjacent portion of the lining free, means for engaging an exposed edge of the lining on the opposite side thereof with respect to the edge of the shoe which is engaged while leaving the adjacent portion of the shoe free for applying a measured degree of pressure against the edge of the brake lining and thereby setting up a shear stress transversely across the face of the shoe between the shoe and the lining, and an impact member pivotally mounted on the frame and normally urged into contact with the anvil-forming means, said impact member being adapted to be moved outwardly away from contact with the anvil-forming means and being adapted to swing back into contact therewith upon being released for sharply impacting the shoe and lining assembly in a direction which is opposite to the direction of application of the sheer force and while the sheer force is being applied.

2. A brake lining testing machine comprising a frame for holding a brake shoe to which a section of brake lining has been adhesively bonded with the edges of the lining in exposed position, means for holding the shoe stationary, means for applying a measured degree of pressure against only one exposed edge of the brake lining thereby producing a shear force transversely across the inner face between the brake shoe and lining wherein the adhesive bond is located, and an impact member pivotally mounted on the frame and normally urged into contact with the brake shoe holding means, said impact member being adapted to be shifted outwardly out of contact with the brake shoe holding means and being capable of shifting backwardly into contact position upon release for striking a sharp blow against the shoe holding means in a direction which is opposite to the direction of application of the sheer force.

3. A brake lining testing machine comprising a frame for holding a lined brake shoe, a power-driven ram reciprocably mounted adjacent said holding means for abutment against an edge of the brake lining to impose transversely directed shear force across the face of the shoe between the lining and the shoe, and an impact member pivotally mounted on the frame and normally urged into contact with the brake shoe holding means, said impact member being adapted to be shifted outwardly out of contact with the brake shoe holding means and being capable of shifting backwardly into contact position upon release for striking a sharp blow against the holding means in a direction which is opposite to the direction of application of the sheer force and while the sheer force is being applied.

4. A testing machine for determining the strength of securement between a brake lining and the brake shoe upon which it is mounted, said testing machine comprising a frame for holding the brake shoe in fixed position with the brake lining fully exposed and unsupported except for its securement to the shoe, means for applying a measured force to the brake lining only in a direction adapted to produce transversely directed shear force between the shoe and the brake lining, and an impact member pivotally mounted on the frame and normally urged into contact with the brake shoe holding means, said impact member being adapted to be shifted outwardly out of contact with the brake shoe holding means and being capable of shifting backwardly into contact position upon release for striking a sharp blow against the shoe holding means in a direction opposite to the direction of application of the sheer force and while the sheer force is being applied.

5. A brake lining testing machine comprising a frame for holding a lined brake shoe with the edges of the shoe and the lining in substantially exposed position, anvil-forming means for engaging one exposed edge of the shoe while leaving the adjacent portion of the lining free, means for engaging an exposed edge of the lining on the opposite side thereof with respect to the edge of the shoe which is engaged while leaving the adjacent portion of the shoe free for applying a measured degree of pressure against the edge of the brake lining and thereby setting up a shear stress transversely across the face of the shoe between the shoe and the lining, an impact member pivotally mounted on the frame and normally urged into contact with the anvil-forming means, said impact member being adapted to be moved outwardly away from contact with the anvil-forming means and adapted to swing back into contact therewith upon being released for sharply impacting the shoe and lining assembly a direction opposite to the direction of application of the shear force and while the shear force is being applied, and adjustable stop means operatively mounted on the frame for limiting the outward retractive movement of the impact member so as to adjust the degree of intensity of blow struck thereby when drawn back and released.

References Cited in the file of this patent

UNITED STATES PATENTS

| Number | Name | Date |
| --- | --- | --- |
| 2,261,783 | Stull | Nov. 4, 1941 |
| 2,353,056 | Martindell | July 4, 1944 |
| 2,448,486 | Chester | Aug. 31, 1948 |